United States Patent [19]

Takahashi et al.

[11] 3,766,412

[45] Oct. 16, 1973

[54] CIRCUIT FOR CONTROLLING THE PULSE WIDTH OF A MONOTONICALLY INCREASING WAVE FORM

[75] Inventors: Makoto Takahashi; Takao Hashimoto; Akinori Takahashi, all of Tokyo, Japan

[73] Assignees: Yashica Co., Ltd.; Nippon Electric Company Limited, Tokyo, Japan

[22] Filed: Sept. 11, 1972

[21] Appl. No.: 287,777

[30] Foreign Application Priority Data

Sept. 14, 1971 Japan .............................. 46/71913

[52] U.S. Cl. ................ 307/265, 307/264, 307/268, 307/270, 307/313, 330/30 D, 328/172

[51] Int. Cl. ....... H03k 4/48, H03k 5/04, H03f 3/18

[58] Field of Search ............... 307/235 R, 255, 288, 307/297, 313, 265, 268, 264, 270; 328/58, 150, 171, 172; 330/23, 25, 30 D

[56] References Cited

UNITED STATES PATENTS

| | | | |
|---|---|---|---|
| 3,277,319 | 10/1966 | Stevens, Jr. | 307/265 |
| 3,532,909 | 10/1970 | Buckley | 307/213 |
| 3,551,832 | 12/1970 | Graeme | 330/30 D X |
| 3,648,061 | 3/1972 | Black et al. | 307/213 X |
| 3,684,971 | 8/1972 | Winkel | 330/30 D |
| 3,688,209 | 8/1972 | Winkel | 330/30 D |

*Primary Examiner*—John W. Huckert
*Assistant Examiner*—L. N. Anagnos
*Attorney*—Nichol M. Sandoe et al.

[57] ABSTRACT

A differential amplifier having a pair of common emitter transistors for adjustably controlling the pulse width of a monotanically increasing wave form is provided with a resistor interposed between the control terminal and the base of the control transistor, and a constant current circuit connected between this base and the D.C. source for the control transistor, whereby a constant current supplied by the constant current circuit is caused to flow through the resistor.

6 Claims, 2 Drawing Figures

CIRCUIT FOR CONTROLLING THE PULSE WIDTH OF A MONOTONICALLY INCREASING WAVE FORM

BACKGROUND OF THE INVENTION

This invention relates to a circuit for controlling the width of a pulse of a monotonically increasing wave form, such as a single saw-tooth electronic signal or a like wave form. A circuit of this kind may be used to effect a delay in a switching circuit.

Conventional circuits responsive to a pulse of a monotonically increasing wave form for producing a similar pulse of a desired duration oftne make use of the input-to-output characteristics of a differential amplifier including a pair of common emitter transistors and accompanied by a level shifting drive circuit. As will later become clear as the description of the present invention proceeds, an input pulse of monotonically increasing voltage $V_1$ given by $$V_1 = f(t) \text{ for } 0 \quad t < T,$$

$$f(T) = 0$$

and $$\delta V_1/\delta t > 0 \qquad (1)$$

is applied to the base of a first transistor of the differential amplifier while an adjustable stationary constant reference voltage $V_2$ is applied to the base of a second transistor of the amplifier. The collector current $I_{cl}$ of the first transistor supplied from the level shift drive circuit increases from zero to such a particular value $I$ at a certain time $T_a$ as may be capable of resulting in reversal of the level shift drive circuit. The time $T_a$ gives the width of the output pulse. The input voltage $F(T_a)$ or $V_1(T_a)$ at the time $T_a$ is determined from the circuit design as $$V_1(T_a) = V_2 - h.ln(I_{c3}/I - 1), \qquad (2)$$

where $h$ is a physical constant given by $kT/q$ ($k$, $T$, and $q$ respresent Boltzmann's constant, the ambient temperature in Kelvin, and the electric charge of an electron, respectively) whose value is, for example, about 26 millivolts at room temperature; in represents the natural logarithm operator; and $I_{c3}$ represents the collector current of a third transistor supplying the emitter currents of the first and the second transistors. From Equation (1), the time $T_a$ is given by the use of an inverse transform $V_1^{-1}$ as $$T_a = V_1^{-1}[V_2 - h.ln(I_{c3}/I - 1)], \qquad 3$$

which shows that the width $T_a$ of the output pulse is controllable by the adjustable stationary voltage $V_2$ but is subject to the so-called offset voltage $h.ln(I_{c3}/I - 1)$ dependent on the circuit design. It has therefore been necessary with a plurality of the circuits of the type described to adjust the stationary voltage $V_2$ to differing individual values when it is desired to derive output pulses of equal width from a given input pulse. The presence of the offset voltage has thus caused various inconveniences in circuit design and rendered it difficult to utilize integrated circuit techniques of manufacture.

The adverse effects of the offset voltage may be eliminated when use is made of a constant voltage $V_2$ sufficiently higher than the offset voltage. This, however, restricts the range of adjustment of the output pulse width. Alternatively, the offset voltage may be rendered negligible if the particular value $I$ of the collector current $I_{cl}$ of the first transistor is made to approach one half of the common emitter current of the first and the second transistors. This, however, requires a low input impedance for the first transistor and consequently a high voltage input pulse. In addition, the circuit loses its efficacy for an input pulse characterized by a very slowly increasing wave form, deriving therefrom an output signal of a substantially constant voltage. Another proposal is revealed in Japanese Patent Publication No. Syo 45–29846 published the 29th day of September, 1970, wherein the differential amplifier is provided with circuit means for compensating the offest voltage. This proposal appears to be effective and seemingly has an additional advantage of providing temperature compensation. The latter advantage, however, is not practical in view of the difficulties of actually determining the resistance values of the resistors used in the offset voltage compensating circuit, and in view of the restrictions imposed on integrated circuit fabrication in maintaining the precision of the selected resistances.

SUMMARY OF THE INVENTION

It is therefore an object of the instant invention to provide a circuit for controlling the width of a pulse of a monotonically increasing wave form where problems associated with offset voltage are substantially eliminated.

It is another object of this invention to provide a circuit of the type described, wherein problems related to circuit design are considerably reduced.

A specific object of this invention is to provide a circuit of the type described utilizing a relatively low source voltage.

Another specific object of this invention is to provide a circuit of the type described, having stable temperature characteristics.

Still another specific object of this invention is to provide a circuit of the type described, having a relatively high input impedance.

It is a further object of this invention to provide a circuit of the type described, which may be easily manufactured in quantity in integrated circuit form.

In accordance with this invention, there is provided a circuit responsive to an input pulse of a monotonically increasing wave form and an adjustable constant voltage for producing an output pulse of a width determined by said stationary voltage. The circuit includes an input and a control terminal supplied with said input pulse and said stationary voltage, respectively, a first transistor having its base connected to said input terminal, a second transistor having its base operatively coupled to said control terminal; and a D.C. source for said transistors, the collector current of said first transistor providing said output pulse, said first and second transistors forming a differential amplifier, wherein the improvement comprises a resistor interposed between said control terminal and said base of said second transistor and a constant current circuit connected between said D.C. source and said base of said second transistor, whereby the constant current supplied by said constant current circuit is caused to flow through said resistor.

DESCRIPTION OF THE PREFERRED EMBODIMENTS

Figure 1:
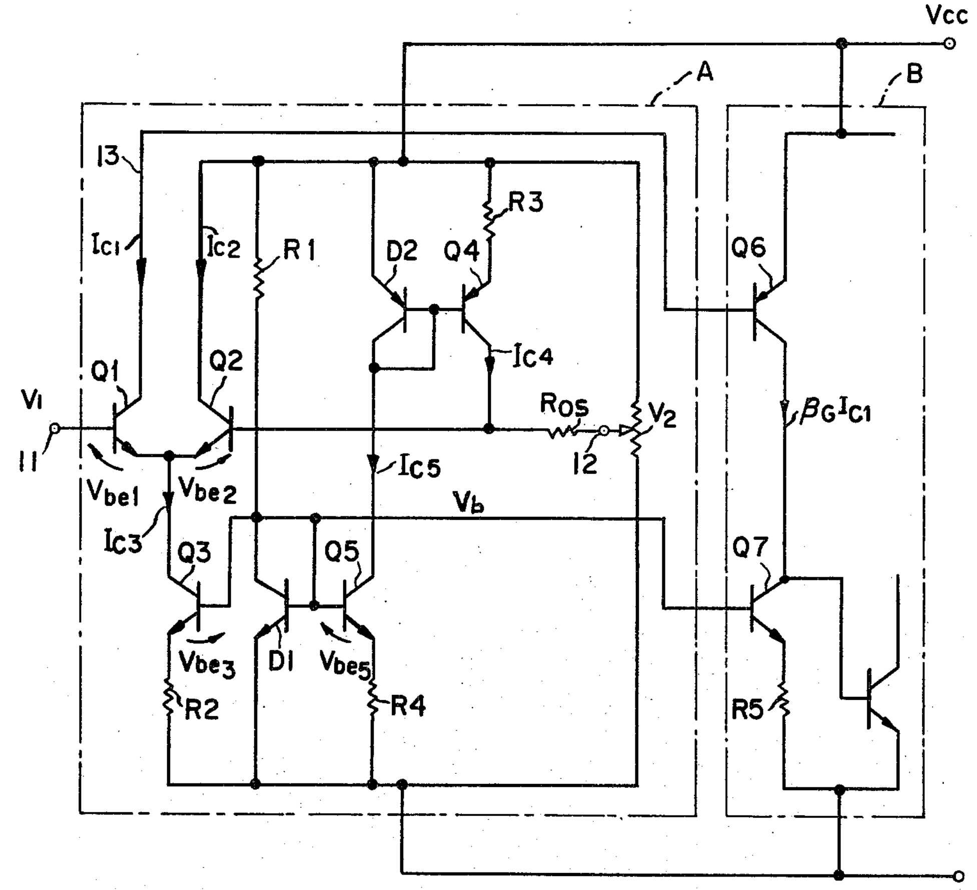
FIG. 1 is a circuit diagram of an embodiment of the present invention.

Referring to FIG. 1, a circuit according to the instant invention comprises a differential amplifier A and an accompanying level shift drive circuit B. As is the case with a conventional circuit of this type, the amplifier A compirses a pair of first and a second transistors Q1 and Q2 connected in a common emitter configuration; an input terminal 11 connected to the base of the first transistor Q1 for applying a pulse voltage $V_1$ to the base; a control terminal 12 coupled to the base of the second transistor Q2; a collector source $V_{cc}$ of collector voltage $V_{cc}$ for the second transistor Q2, a potentiometer $V_2$ for deriving an adjustable nonvarying voltage $V_2$ from the collector voltage $V_{cc}$; a collector lead 13 of the first transistor Q1 extending from the collector source $V_{cc}$ through the level shift drive circuit B; and a constant current source for the differential amplifier A comprising a third transistor Q3, a first diode D1, a resistor R1 for the diode D1, and an emitter resistor $R2$ for the third transistor Q3 connected in the conventional manner as shown.

In accordance with this invention; the differential amplifier A further comprises an offset resistor $R_{os}$ interposed between the control terminal 12 and the base of the second transistor Q2 for providing offset voltage compensation in the manner described below, and a first constant current circuit comprising a fourth transistor Q4 having its collector connected to the base of the second transistor Q2 and its emitter connected to the collector source $V_{cc}$ through an emitter resistor R3. A second diode D2 is interposed between the base of the fourth transistor Q4 and the collector source $V_{cc}$, the constant current circuit thus shunting the base-collector junction of the second transistor Q2.

The differential amplifier A still further comprises a fifth transistor Q5 having its base maintained at the base potential of the third transistor Q3, its emitter connected to ground through an emitter resistor $R4$, and its collector connected to the base of the fourth transistor Q4 for ordinarily supplying a constant current to the last-mentioned base, thus forming a second constant current circuit. The level shift drive circuit B comprises a first-stage or a sixth transistor Q6, such as a pnp transistor, having a sufficently large current amplification factor $\beta_6$, having its base connected to the collector lead 13 and its emitter connected to the collector source $V_{cc}$, and a seventh transistor Q7 with its base connected to the bases of the third and the fifth transistors Q3 and Q5, its collector connected to the collector of the sixth transistor Q6, and its emitter connected to ground through an emitter resistor R5.

In operation, it is assumed that the first and the second transistors Q1 and Q2 have substantially equal saturation current $I_s$; that the third and the fifth transistors Q3 and Q5 have sufficiently similar characteristics such as to present a substantially equal base-emitter potential difference $V_{be3}$ or $V_{be5}$; that the fourth and the fifth transistors Q4 and Q5 have substantially complementary characteristics; and that the emitter resistors $R2$, $R4$, and $R5$ for the third, the fifth, and the seventh transistors Q3, Q5, and Q7 have substantially equal resistances. It is well-known that the offset voltage $V_{os}$ which qppears between the bases of the first and the second transistors Q1 and Q2 is given by $$V_{os} = V_{be2} - V_{be1} = h.ln(I_{c2}/I_s) - h.ln(I_{c1}/I_s)$$
$$= h.ln(I_{c2}/I_{c1}) = h.ln(I_{c3}/I_{cl} - 1)$$

if a constant current $I_{c3}$ is supplied to these transistors Q1 and Q2 from the constant current source to provide the collector currents $I_{c1}$ and $I_{c2}$. The common base potential $V_b$ of the third and the fifth transistors Q3 and Q5 is given by $$V_b = R2.I_{c3} + V_{be3} = R4.I_{c5} + V_{be5},$$

where $I_{c5}$ represents the collector current of the fifth transistor Q5. These qualities show that the collector current $I_{c5}$ of the fifth transistor Q5 is equal to the collector current $I_{c3}$ of the third transistor Q3 and is constant. The first constant current ciruit connected across the base-collector junction of the second transistor Q2 supplies such a conssant current $I_{c4}$ to the offset resistor $R_{os}$ as may be given by $$h.ln(I_{c5}/I_s) = R3.I_{c4} + h.ln(I_{c4}/I_s)$$

because the base of the second diode D2 is connected to the base of the fourth transistor Q4. Furthermore, $$I_{c4} = h.ln(I_{c5}/I_{c4})/R3 = h.ln(I_{c3}/I_{c4})/R3 \quad 5$$

results because of the complementary nature of the fourth and the fifth transistors Q4 and Q5. As a result, the potential difference $V_{os}'$ developed across the offset resistor $R_{os}$ is given by $$V_{os}' = R_{os}.I_{c4} = R_{os}.h.ln(I_{c3}/I_{c4})/R3, \quad 6$$

which may be made equal to the offest voltage $V_{os}$ given by Equation (4) by selection of the resistance of the offset resistor $R_{os}$ and the constant current $I_{c4}$. The base of the second transistor Q2 is thus supplied with a potential given by the sum of the adjustable stationary voltage $V_2$ and this offset compensation voltage $V_{os}'$. When a pulse signal given by Formulae (1) is applied to the input terminal 11, the time $T_a$ at which the collector current $I_{cl}$ of the first transistor Q1 reaches the particular value I for causing reversal of the level shift drive circuit B is now given by $$T_a = V_1^{-1}(V_2) \quad 7$$

by substituting the sum for the expression $V_2$ is Equation (3). This means that the width $T_a$ of the output pulse is uniquely determined by the adjustable stationary voltage $V_2$ supplied to the control terminal 12. In this connection it is to be noted that the adjustable constant voltage $V_2$ may be given by potential division of the collector voltage $V_{cc}$ in the conventional manner to uniquely determine the width of the output pulse by the ratio of the resistances of the potentiometer $V_2$, and that it is easy with a monolithic integrated circuit to manufacture transistors having substantially the same characteristics and resistors having desired resistance ratios, with the result that the integrated circuit techniques are well applicable to the circuits according to this invention.

As mentioned above, the base of the fourth transistor Q4 is ordinarily supplied with that collector current $I_{c5}$ of the fifth transistor Q5 which is equal to the collector current $I_{c3}$ of the third transistor Q3 of substantially similar characteristics, and is constant with respect to temperature variations. It is therefore easy in accordance with this invention to achieve temperature compensation with the simple circuit arrangement described above.

From Equations (5) and (6), $$V_{os}' = h.ln(I_{c5}/I_{c4}).R_{os}/R3$$
$$= h.ln(I_{c5}/I_{c3}.I_{c3}/I_{c1}.I_{c1}/I_{c4}).R_{os}/R3$$
$$= h.[ln(I_{c3}/I_{c1}) + ln(I_{c5}/I_{c3})/(I_{c4}/I_{c1})].R_{os}/R3,$$

in which the second term in the brackets may be rendered negligible by selection of the current ratios $I_{c5}/I_{c3}$ and $I_{c4}/I_{c1}$. It is thus possible to use a relatively large output current $I_{c4}$ for the constant current circuit shunting the base-collector junction of the second transistor Q2 and, accordingly, to employ a relatively small offset resistance $R_{os}$ so that the effect caused by the offset resistor $R_{os}$ on the base resistance of the second transistor Q2 is obviated to a certain extent to provide a circuit according to this invention with a low input impedance.

In brief, it is possible with this invention to compensate the offset voltage of the transistorized differential amplifier A with a circuit arrangement capable of producing an output pulse of a uniquely controllable width with a relatively simple circuit design; which is adapted to exhibit temperature compensation; and which is amenable to integrated circuit manufacture.

In the level shift drive circuit B, the collector current $\beta_6 I_{c1}$ of the sixth transistor Q6 may be made equal to the constant current $I_{c3}$ or $I_{c5}$. It is now possible to represent the offset voltage $V_{os}$ as $$V_{os} = h.ln(\beta_6 - 1) \approx h.ln\beta_6$$

from Equation (4). The voltage $V_{os}'$ developed across the offset resistor $R_{os}$ is now given by $V_{os}' = h.ln(I_{c3}/I_{c1}.I_{c1}/I_{c4}).R_{os}/R3$ $$= h.[ln\beta_6 + ln(I_{c1}/I_{c4})].R_{os}/R3 \tag{8}$$

from Equation (6). As a consequence, it is possible to compensate the offset voltage by selecting the resistance $R3$ of the emitter resistor $R3$ of the fourth transistor Q4 so as to make the collector currents $I_{cl}$ and $I_{c4}$ of the first and the fourth transistors Q1 and Q4 approximately equal to each other and by making the resistance of the offset resistor $R_{os}$ equal to that of this resistor $R3$. These conditions for the circuit are available under the ordinary range of operation wherein the current input to the base of the first transistor Q1 is small and consequently the collector current $I_{cl}$ of the first transistor Q1 is sufficiently small compared with the collector current $I_{c2}$ of the second transistor Q2. In other words, it is possible in the case of a low input level to compensate the offset voltage $V_{os}$ predominantly by the current amplification of the sixth transistor Q6 by rendering its collector current a constant and to effect temperature compensation as well. Similar circuit design is possible, with the collector current of the sixth transistor Q6 different from either of the collector currents $I_{c3}$ and $I_{c5}$ of the third and the fifth transistors Q3 and Q5, by selection of the ratio of these currents.

Figure 2:
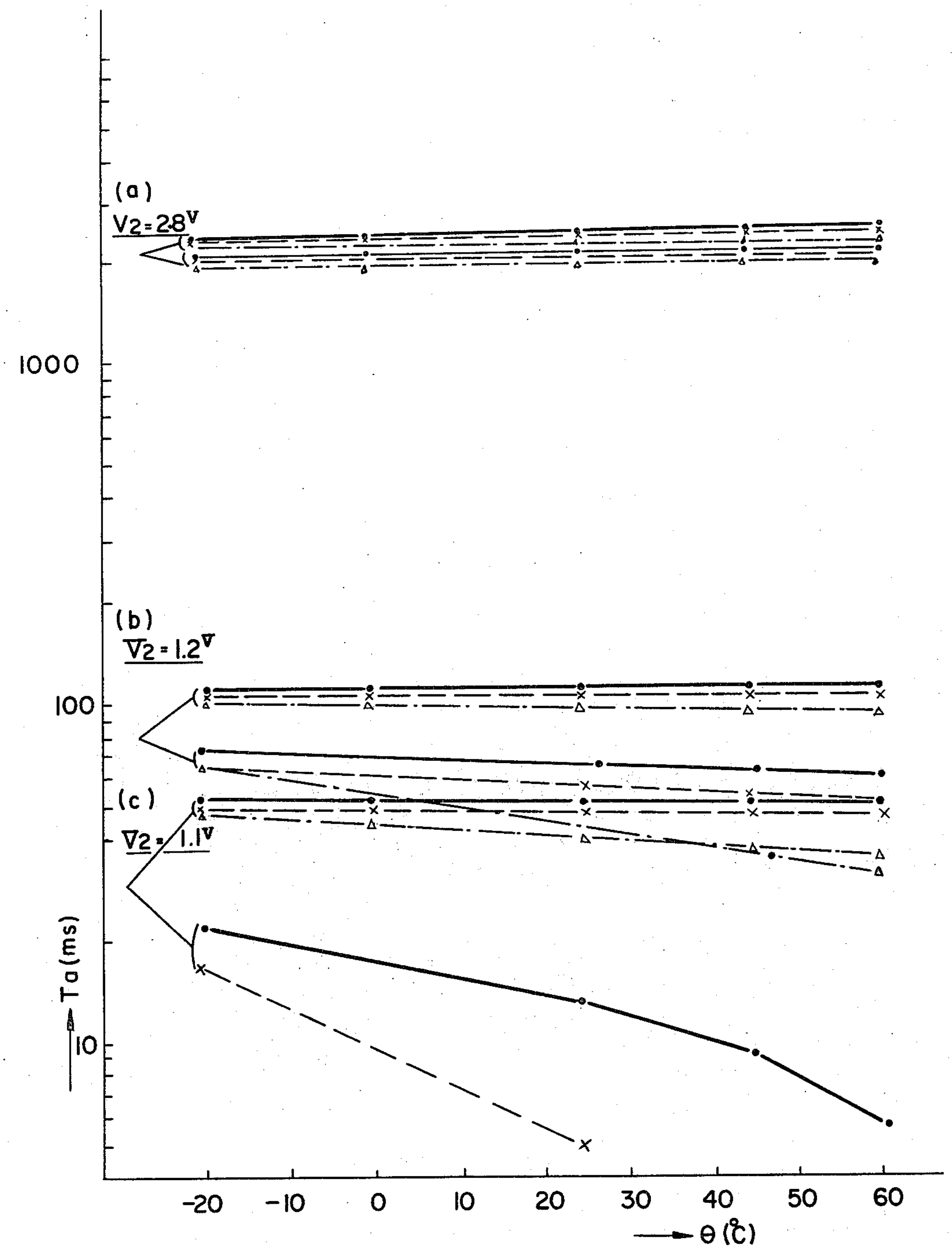
FIG. 2 shows the temperature compensation characteristics of an example of the circuits according to the present invention in comparison with those of a conventional circuit of a like kind.

Referring to FIG. 2, the widths $T_a$ (milliseconds) of the output pulse are shown versus the ambient temperatures $\theta$ (°0) with the control voltage $V_2$ (volts) used as a parameter. In each set of the curves, the solid line curve, the broken line curve, and the dash-and-dot line curve are for collector voltages $V_{cc}$ of 3.0 volts, 2.4 volts, and 1.8 volts, respectively. In each of the groups (*a*), (*b*), and (*c*), the upper sets of the curves are for a circuit according to this invention wherein the current amplification of the sixth transistor Q6 is about 100, the current ratio of either of the collector currents $I_{c3}$ and $I_{c5}$ in the other constant collector current of the sixth transistor Q6 is so adapted to low input levels as to make it possible to neglect the second term in the brackets in Equation (8), and the input pulse $V_1$ given by Formulae (1) and the adjustable voltage $V_2$ are derived individually from the common D.C. source $V_{cc}$. The lower sets of the curves depict the results obtained with a conventional circuit. It is apparent from FIG. 2 that both circuits show excellent temperature compensation in the group (*a*) of the curves where the stationary voltage $V_2$ is as high as 2.8 volts. For lower input levels given by groups (*b*) and (*c*) of the curves where the stationary voltage $V_2$ is equal to 1.2 volts and 1.1 volts, respectively, the circuit according to this invention presents excellent temperature compensation while the conventional circuit is subject to variations with the ambient temperatures.

With a circuit according to this invention where the input pulse $V_1$ is derived from the D.C. source $V_{cc}$, both the input pulse $V_1$ and the adjustable constant voltage $V_2$ are proportional to the D.C. voltage $V_{cc}$. As a result, the width $T_a$ of the output pulse is entirely independent of the fluctuation of the voltage of the D.C. source $V_{cc}$ as will also be obvious from Equation (7). The minimum operable voltage is therefore unique for the circuit arrangement, which fact further facilitates circuit design. For example, it is possible with the first-stage transistor Q6 of the level shift drive circuit B provided with a large current amplification as mentioned above to use as low a source voltage as of the order of 1.8 volts which is the sum of the minimum of the collector-emitter voltages of the first and the third transistors Q1 and Q3 and the minimum of the base-emitter voltage of the first-stage transistor Q6. In addition, it is possible to use transistors of large current amplifications as the first and the second transistors Q1 and Q2 without any adverse effects on the performance of the circuit according to this invention, which fact makes it possible to realize a circuit of very high input impedance, thereby adapting the circuit to low input levels. For example, it is feasible with a first transistor Q1 of the current amplification of 500 to make the circuit responsive to an input pulse of 6 nanoamperes when the current $I_{c3}$ of the constant current source is 10 microamperes and the reversal of the level shift drive circuit B takes place at the particular value I of 3 microamperes. It is also to be noted that it is possible to reduce the minimum value of the adjustable stationary voltage $V_2$ to a value given by the sum of the minimum of the base-emitter voltage of the first transistor Q1 and the collector-emitter voltage of the third transistor Q3, which fact provides a wide range of control of the output pulse width.

The above-described arrangement is merely illustrative of the principles of the present invention. Numerous modifications and adaptations thereof will be readily apparent to those skilled in the art without departing from the spirit and scope of the present invention.

What is claimed is:

1. A circuit responsive to an input pulse of a monotonically increasing wave form and an adjustable stationary voltage for producing an output pulse of a width determined by said stationary voltage including an input terminal and a control terminal supplied with said input pulse and said stationary voltage, respectively, a first transistor having its base connected to said input terminal, a second transistor having its base operatively coupled to said control terminal, and a D.C. source for said transistors, said first and said second transistors forming a differential amplifier, the collector current of said first transistor providing said output pulse, wherein the improvement comprises a resistor interposed between said control terminal and said base of said second transistor and a constant current circuit connected between said D.C. source and said base of said second transistor, whereby the constant current supplied by said constant current circuit is caused to flow through said resistor.

2. A circuit as claimed in claim 1, said differential amplifier including a constant current source having a third transistor whose collector current is supplied to said first and said second transistors as a constant current, wherein said constant current circuit comprises a fourth transistor and an emitter resistor therefor for supplying its collector current as said constant current of said constant current circuit, the resistance of said emitter resistor and the ratio of the collector currents of said third and said fourth transistors being selected to provide the last-mentioned constant current that develops across said resistor interposed between said control terminal and said base of said second transistor a voltage which is equal to the offset voltage of said differential amplifier.

3. A circuit as claimed in claim 2, wherein said differential amplifier further comprises a fifth transistor having its base directly connected to the base of said third transistor and having its collector connected to the base of said fourth transistor, said third and said fifth transistors having substantially the same characteristics, and fifth transistor thereby supplying the base current of said fourth transistor which is substantially equal to the collector current of said third transistor.

4. In combination in an analog comparator, a first transistor having its base connected as an input terminal for receiving a variable input potential, a control terminal adapted for connection to a reference potential, a second transistor having its base operatively coupled to said control terminal, and a D.C. source for said transistors, said first and said second transistors forming a differential amplifier, the collector of said first transistor providing a comparator output, wherein the improvement comprises a resistor interposed between said control terminal and said base of said second transistor and a constant current circuit connected between said D.C. source and said base of said second transistor, whereby the constant current supplied by said constant current circuit is caused to flow through said resistor.

5. A combination claimed in claim 4, said differential amplifier including a constant current source having a third transistor whose collector current is supplied to said first and said second transistors as a constant current, wherein said constant current circuit comprises a fourth transistor and an emitter resistor therefor for supplying its collector current as said constant current of said constant current circuit, the resistance of said emitter resistor and the ratio of the collector currents of said third and said fourth transistors being selected to provide said constant current that develops across said resistor interposed between said control terminal and said base of said second transistor a voltage which is equal to the offset voltage of said differential amplifier.

6. A combination as claimed in claim 5, wherein said differential amplifier further comprises a fifth transistor having its base directly connected to the base of said third transistor and having its collector connected to the base of said fourth transistor, said third and said fifth transistors having substantially the same characteristics, said fifth transistor thereby supplying the base current of said fourth transistor which is substantially equal to the collector current of said third transistor.

* * * * *